(12) United States Patent
Hayashi et al.

(10) Patent No.: US 11,538,258 B2
(45) Date of Patent: Dec. 27, 2022

(54) ANALYSIS APPARATUS, ANALYSIS METHOD, AND NON-TRANSITORY STORAGE MEDIUM FOR DECIDING THE NUMBER OF OCCUPANTS DETECTED IN A VEHICLE

(71) Applicant: NEC CORPORATION, Tokyo (JP)

(72) Inventors: Haruyuki Hayashi, Tokyo (JP); Yusuke Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 212 days.

(21) Appl. No.: 16/629,091

(22) PCT Filed: Oct. 25, 2017

(86) PCT No.: PCT/JP2017/038455
§ 371 (c)(1),
(2) Date: Jan. 7, 2020

(87) PCT Pub. No.: WO2019/012710
PCT Pub. Date: Jan. 17, 2019

(65) Prior Publication Data
US 2020/0210732 A1    Jul. 2, 2020

(30) Foreign Application Priority Data

Jul. 13, 2017    (JP) .............................. JP2017-136952

(51) Int. Cl.
*G06K 9/00* (2022.01)
*G06V 20/59* (2022.01)
*H04N 5/247* (2006.01)

(52) U.S. Cl.
CPC ........... *G06V 20/593* (2022.01); *H04N 5/247* (2013.01)

(58) Field of Classification Search
None
See application file for complete search history.

(56) References Cited

U.S. PATENT DOCUMENTS

2009/0309974 A1* 12/2009 Agrawal .................. G08G 1/04
348/159
2010/0169007 A1* 7/2010 Kaushik ................. G01C 21/26
701/532

(Continued)

FOREIGN PATENT DOCUMENTS

JP    2004-348469 A    12/2004
JP    2016-119627 A    6/2016

(Continued)

OTHER PUBLICATIONS

International Search Report for PCT/JP2017/038455 dated Nov. 21, 2017 [PCT/ISA/210].

(Continued)

*Primary Examiner* — Guillermo M Rivera-Martinez

(57) ABSTRACT

An analysis apparatus detects persons from a first image generated by a first camera that captures a vehicle, detects the number of occupants in the vehicle captured in the first image, detects persons from a second image generated by a second camera that captures the vehicle, detects the number of occupants in the vehicle captured in the second image, determines whether or not the first image and the second image satisfy a predetermined condition, and decides, in a case where the first image and the second image satisfy the predetermined condition, the number of occupants in the vehicle with use of the number of occupants in the vehicle captured in the first image and the number of occupants in the vehicle captured in the second image.

11 Claims, 10 Drawing Sheets

(56) References Cited

U.S. PATENT DOCUMENTS

| | | | | |
|---|---|---|---|---|
| 2012/0033123 | A1* | 2/2012 | Inoue | G08G 1/08 348/333.13 |
| 2013/0141574 | A1* | 6/2013 | Dalal | G06K 9/2018 348/148 |
| 2013/0278768 | A1* | 10/2013 | Paul | G08G 1/0175 348/148 |
| 2014/0180773 | A1* | 6/2014 | Zafiroglu | G07B 15/063 705/13 |
| 2014/0309789 | A1* | 10/2014 | Ricci | H04W 4/21 700/276 |
| 2014/0334684 | A1* | 11/2014 | Strimling | G06K 9/3258 382/105 |
| 2015/0062340 | A1* | 3/2015 | Datta | H04N 5/2252 348/148 |
| 2015/0278617 | A1* | 10/2015 | Oami | G06T 1/60 382/103 |
| 2015/0279036 | A1* | 10/2015 | Artan | G06K 9/6204 382/159 |
| 2015/0294144 | A1* | 10/2015 | Konishi | G06K 9/00255 382/103 |
| 2016/0239714 | A1* | 8/2016 | Oami | G06K 9/00838 |
| 2017/0017846 | A1* | 1/2017 | Felemban | G06K 9/4642 |
| 2017/0243067 | A1* | 8/2017 | Bulan | G06K 9/00832 |

FOREIGN PATENT DOCUMENTS

| | | |
|---|---|---|
| WO | 2014/061195 A1 | 4/2014 |
| WO | 2014/064898 A1 | 5/2014 |

OTHER PUBLICATIONS

Communication dated May 28, 2020 by the European Patent Office in application No. 17917502.1.

* cited by examiner

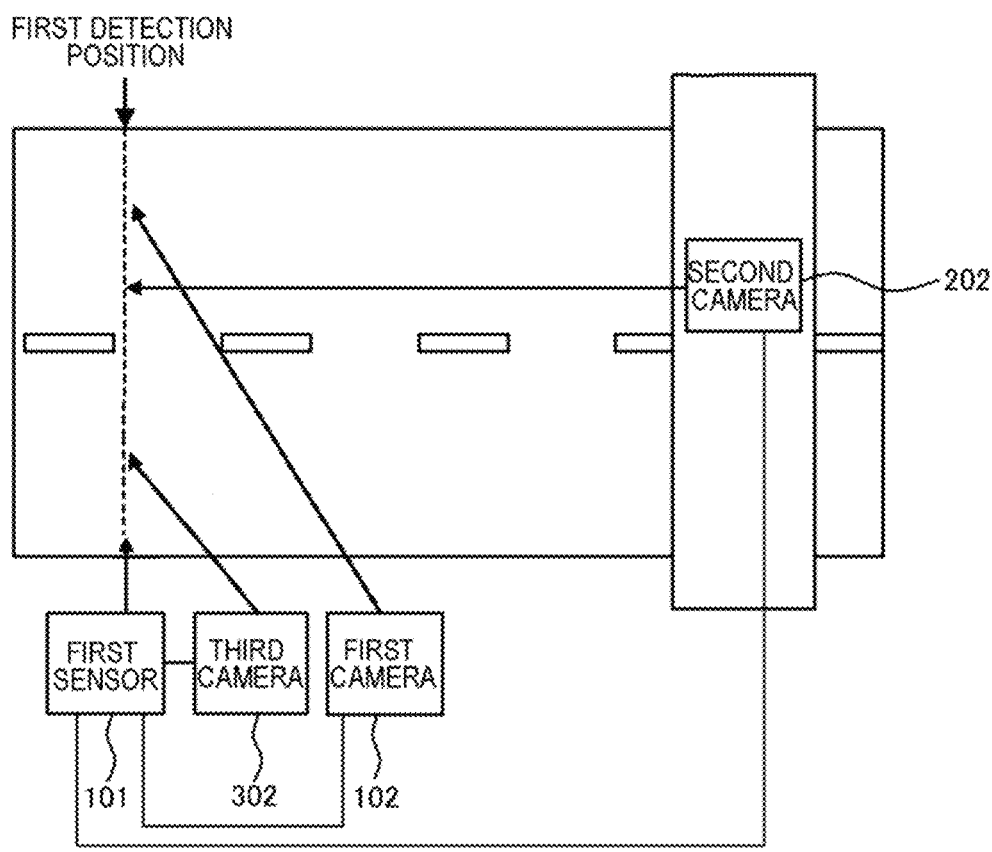

ANALYSIS APPARATUS, ANALYSIS METHOD, AND NON-TRANSITORY STORAGE MEDIUM FOR DECIDING THE NUMBER OF OCCUPANTS DETECTED IN A VEHICLE

CROSS REFERENCE TO RELATED APPLICATIONS

This application is a National Stage of International Application No. PCT/JP2017/038455 filed Oct. 25, 2017, claiming priority based on Japanese Patent Application No. 2017-136952 filed Jul. 13, 2017, the disclosure of which is incorporated herein in its entirety by reference.

TECHNICAL FIELD

The present invention relates to an analysis apparatus, an analysis method, and a program.

BACKGROUND ART

Patent Document 1 and 2 disclose apparatuses which detect the number of persons on a vehicle.

Patent Document 1 discloses an apparatus which detects a profile of a person by analyzing an image captured from the side of a vehicle and decides the number of persons on the vehicle on the basis of the detection result. Further, Patent Document 1 discloses that the maximum value, average value, or sum of the number of profiles obtained by a profile detection unit on the basis of the image captured by a first imaging apparatus and the number of front faces obtained by a front face detection unit on the basis of the image captured by a second imaging apparatus is decided as the number of persons existing in the vehicle.

Patent Document 2 discloses an apparatus which detects persons by analyzing each of a plurality of images obtained by continuously capturing a vehicle, infers which seat in the vehicle is taken by each detected person on the basis of how the vehicle looks in each image, and decides the number of persons on the vehicle on the basis of the number of seats that are determined to be taken.

RELATED DOCUMENT

Patent Document

[Patent Document 1] Pamphlet of International Publication No. WO2014/061195
[Patent Document 2] Pamphlet of International Publication No. WO2014/064898

SUMMARY OF THE INVENTION

Technical Problem

An object of the present invention is to provide a new technique for detecting the number of persons on a vehicle.

Solution to Problem

According to the present invention, there is provided an analysis apparatus including a first image analysis unit that detects persons from a first image generated by a first camera for capturing a vehicle passing through a road; a first detection unit that detects the number of occupants in the vehicle captured in the first image, on the basis of a detection result by the first image analysis unit; a second image analysis unit that detects persons from a second image generated by a second camera for capturing the vehicle passing through the road; a second detection unit that detects the number of occupants in the vehicle captured in the second image, on the basis of a detection result by the second image analysis unit; a determination unit that determines whether or not the first image and the second image satisfy a predetermined condition; and a decision unit that decides, in a case where the first image and the second image satisfy the predetermined condition, the number of occupants in the vehicle with use of the number of occupants in the vehicle captured in the first image detected by the first detection unit and the number of occupants in the vehicle captured in the second image detected by the second detection unit.

Further, according to the present invention, there is provided an analysis method executed by a computer, the method including a first image analysis step of detecting persons from a first image generated by a first camera for capturing a vehicle passing through a road; a first detection step of detecting the number of occupants in the vehicle captured in the first image, on the basis of a detection result from the first image analysis step; a second image analysis step of detecting persons from a second image generated by a second camera for capturing the vehicle passing through the road; a second detection step of detecting the number of occupants in the vehicle captured in the second image, on the basis of a detection result from the second image analysis step; a determination step of determining whether or not the first image and the second image satisfy a predetermined condition; and a decision step of deciding, in a case where the first image and the second image satisfy the predetermined condition, the number of occupants in the vehicle with use of the number of occupants in the vehicle captured in the first image detected in the first detection step and the number of occupants in the vehicle captured in the second image detected in the second detection step.

Further, according to the present invention, there is provided a program causing a computer to function as: a first image analysis unit that detects persons from a first image generated by a first camera for capturing a vehicle passing through a road; a first detection unit that detects the number of occupants in the vehicle captured in the first image, on the basis of a detection result by the first image analysis unit; a second image analysis unit that detects persons from a second image generated by a second camera for capturing the vehicle passing through the road; a second detection unit that detects the number of occupants in the vehicle captured in the second image, on the basis of a detection result by the second image analysis unit; a determination unit that determines whether or not the first image and the second image satisfy a predetermined condition; and a decision unit that decides, in a case where the first image and the second image satisfy the predetermined condition, the number of occupants in the vehicle with use of the number of occupants in the vehicle captured in the first image detected by the first detection unit and the number of occupants in the vehicle captured in the second image detected by the second detection unit.

Advantageous Effects of Invention

According to the present invention, a new technique for detecting the number of persons on a vehicle is realized.

BRIEF DESCRIPTION OF THE DRAWINGS

The foregoing and other objects, features and advantages will become more apparent from the following description of preferred example embodiments and the accompanying drawings.

FIG. 10 is a diagram for explaining an example of the image capturing method of the present example embodiment.

DESCRIPTION OF EMBODIMENTS

First Example Embodiment

Figure 1:
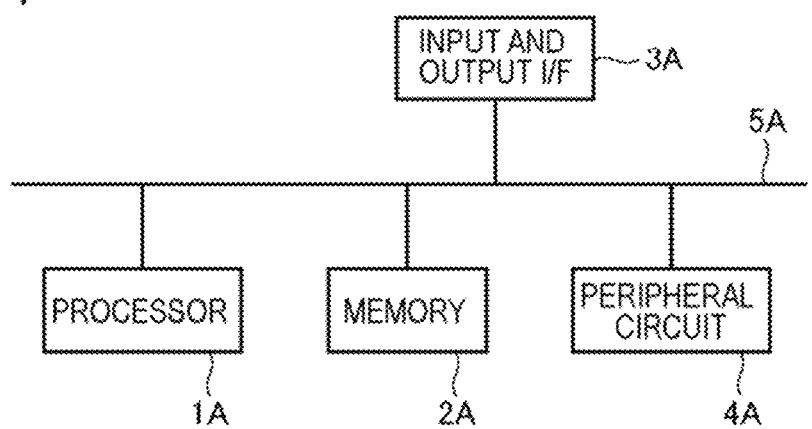
FIG. 1 is a diagram illustrating an example of a hardware configuration of an analysis apparatus of a present example embodiment.

First, the outline of an analysis apparatus of the present example embodiment will be described. The analysis apparatus detects the number of persons on the vehicle, on the basis of the analysis results of the plurality of images captured by the plurality of cameras.

First, the analysis apparatus detects human faces from each of a plurality of first images (hereinafter, it may be referred to as "first image group") captured by a first camera that performs imaging in response to detection of a vehicle by a first sensor. Then, the analysis apparatus detects, on the basis of the detection result, the number of persons on the vehicle that are commonly included in the plurality of first images (the number of persons detected from the first image group).

In addition, the analysis apparatus detects human faces from each of a plurality of second images (hereinafter, it may be referred to as "second image group") captured by a second camera that performs imaging in response to detection of a vehicle by a second sensor. Then, the analysis apparatus detects, on the basis of the detection result, the number of persons on the vehicle that are commonly included in the plurality of second images (the number of persons detected from the second image group).

Further, the analysis apparatus determines whether or not the first image group and the second image group satisfy a predetermined condition. It is inferred that the first image group and the second image group that satisfy the predetermined condition include the same vehicle in the images. The predetermined condition is determined by, for example, the imaging time or the like (details are described below).

In a case where the first image group and the second image group satisfy a predetermined condition, the analysis apparatus decides the number of occupants in the vehicle captured in these images, using the number of occupants in the vehicle captured in the first image group detected from the first image group and the number of occupants in the vehicle captured in the second image group detected from the second image group.

According to the analysis apparatus of the present example embodiment, a new technique for detecting the number of persons on a vehicle is realized.

According to the analysis apparatus of the present example embodiment in which a plurality of cameras capture images, one vehicle can be captured from a plurality of directions. Then, it is possible to detect the number of persons on a vehicle, by analyzing a plurality of images obtained by capturing the vehicle from a plurality of directions. For example, even when at least one occupant is hidden behind an object in an image captured from a certain direction and cannot be detected, all occupants may be detected in an image captured from another direction. According to the analysis apparatus of the present example embodiment which detects the number of persons on the vehicle on the basis of the analysis results of a plurality of images obtained by capturing the vehicle from a plurality of directions, the detection accuracy of the number of occupants is improved.

In addition, the analysis apparatus according to the present example embodiment can detect a pair of the first image group and the second image group inferred to include the same vehicle, by determining whether or not a predetermined condition defined by an imaging time or the like is satisfied. Compared to the case where the characteristics of the vehicle included in the image are detected by image analysis or the like and a pair of the first image group and the second image group including the vehicle having similar characteristics is detected, the processing load on the computer can be reduced.

Hereinafter, the configuration of the analysis apparatus will be described in detail. First, an example of a hardware configuration of the analysis apparatus will be described. Each functional unit included in the analysis apparatus of the present example embodiment is realized by any combination of hardware and software, mainly using a central processing unit (CPU) of any computer, a memory, a program to be loaded into the memory, and a storage unit (can store programs stored in advance in the stage of shipping the apparatus, and also store programs downloaded from a storage medium such as a compact disc (CD) or a server on the Internet) such as a hard disk storing the program, and a network connection interface. Those skilled in the art will understand that there are various modifications in the realization methods and apparatuses.

FIG. 1 is a block diagram illustrating a hardware configuration of an analysis apparatus of the present example embodiment. As illustrated in FIG. 1, the analysis apparatus includes a processor 1A, a memory 2A, an input and output interface 3A, a peripheral circuit 4A, and a bus 5A. The peripheral circuit 4A includes various modules. It should be noted that, the analysis apparatus may be configured by a plurality of apparatuses that are physically and/or logically separated. In this case, each of the plurality of apparatuses includes the processor 1A, the memory 2A, the input and output interface 3A, the peripheral circuit 4A, and the bus 5A.

The bus 5A is a data transmission path through which the processor 1A, the memory 2A, the peripheral circuit 4A and the input and output interface 3A mutually transmit and receive data. The processor 1A is, for example, an arithmetic processing apparatus such as a central processing unit (CPU) or a graphics processing unit (GPU). The memory 2A is, for example, a memory such as a random access memory (RAM) or a read only memory (ROM). The input and output interface 3A includes an interface for acquiring information from an input device (for example, a keyboard, a mouse, a microphone, a physical key, a touch panel display, and a code reader), an external apparatus, an external server, an external sensor, and the like, and an interface for outputting information to an output device (for example, a display, a speaker, a printer, and a emailer), an external apparatus, an external server, and the like. The processor 1A can issue a command to each module and perform a calculation based on the calculation results.

Figure 2:
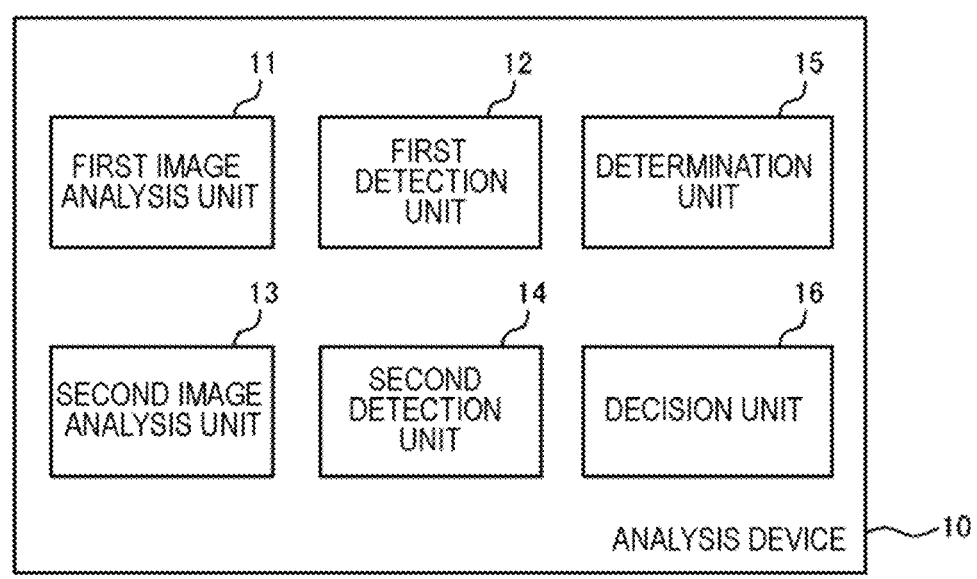
FIG. 2 is an example of a functional block diagram of the analysis apparatus of the present example embodiment.

Next, the functional configuration of the analysis apparatus will be described. FIG. 2 shows an example of a functional block diagram of the analysis apparatus 10. As illustrated, the analysis apparatus 10 includes a first image analysis unit 11, a first detection unit 12, a second image analysis unit 13, a second detection unit 14, a determination unit 15, and a decision unit 16.

The first image analysis unit 11 detects persons (for example, the faces of the persons), from a first image generated by the first camera that captures a vehicle passing through the road. Then, the first detection unit 12 detects the number of occupants in the vehicle captured in the first image, on the basis of the detection result by the first image analysis unit 11. In the present example embodiment, the first image analysis unit 11 detects human faces from each of a plurality of first images (first image group) captured by a first camera that performs imaging in response to vehicle detection by the first sensor. Then, the first detection unit 12 detects the number of persons on the vehicle that are commonly included in the plurality of first images, on the basis of the detection result by the first image analysis unit 11.

The second image analysis unit 13 detects persons (for example, human faces) from a second image generated by the second camera that captures the vehicle passing through the road. Then, the second detection unit 14 detects the number of occupants in the vehicle captured in the second image, on the basis of the detection result by the second image analysis unit 13. In the present example embodiment, the second image analysis unit 13 detects human faces from each of a plurality of second images (second image group) captured by a second camera that performs imaging in response to vehicle detection by the second sensor. Then, the second detection unit 14 detects the number of persons on the vehicle that are commonly included in the plurality of second images, on the basis of the detection result by the second image analysis unit 13.

Here, the installation examples of sensors and cameras are described with reference to FIGS. 3 and 4.

The first sensor 101 is installed along the road and detects a vehicle passing through the road from the side. The first camera 102 is installed along the road and captures a vehicle passing through the road from the side. In the illustrated example, the first sensor 101 is installed along a road having two or more lanes, and detects a vehicle passing through the lane on the far side as viewed from the first sensor 101 from the side. The first camera 102 is installed along a road having two or more lanes, and captures a vehicle passing through the lane on the far side as viewed from the first camera 102 from the side.

The second sensor 201 is installed above the road and detects a vehicle passing through the road from the front. The second camera 202 is installed above the road and captures a vehicle passing through the road from the front. In the case of the illustrated example, the second sensor 201 is installed above the lane on the far side as viewed from the first sensor 101 and the first camera 102, and detects a vehicle passing through the lane on the far side, from the front. The second camera 202 is installed above the lane on the far side as viewed from the first sensor 101 and the first camera 102, and captures a vehicle passing through the lane on the far side, from the front.

For example, the second sensor 201 and the second camera 202 may be attached to an overpass or gantry provided so as to cross the road, may be attached to a sign or a signboard provided above the road, or may be attached to other installations. In addition, a structure for installing the second sensor 201 and the second camera 202 may be newly provided on the road.

The first sensor 101 and the second sensor 201 detect that the vehicle has passed a predetermined position on the road. The details of the first sensor 101 and the second sensor 201 are not limited as long as such detection can be performed. For example, the first sensor 101 and the second sensor 201 may include a means that emits light (for example, laser) in a predetermined direction (for example, the direction of an arrow in the drawing) and a means that receives the reflected light. Then, the passage of the vehicle may be detected by detecting the presence of an obstacle that hinders the progress of the emitted light based on the light receiving status of the reflected light.

In addition, at least one of the first sensor 101 and the second sensor 201 may have a means that measures the distance to the detected obstacle. For example, the distance to the obstacle that reflects the light may be calculated on the basis of the time difference from the light emission timing to the light reception timing of the reflected light.

When detecting the passage of the vehicle, the first sensor 101 inputs a signal indicating that fact to the first camera 102. It should be noted that, the first sensor 101 may detect the passage of the vehicle, and when the detected vehicle satisfies the distance condition, the first sensor 101 may input a signal indicating the fact to the first camera 102. For example, the distance condition may be "the distance from the first sensor 101 to the vehicle is within a reference range". By setting the reference range as a range that can be assumed as the distance between the vehicle traveling in the lane on the far side and the first sensor 101, the first sensor 101 shown in FIGS. 3 and 4 can accurately detect only vehicles that pass through the lane on the far side as viewed from the first sensor 101 (that is, vehicles that pass through the lane on the near side are not detected).

When detecting the passage of the vehicle, the second sensor 201 inputs a signal indicating that fact to the second camera 202. It should be noted that, the second sensor 201 may detect the passage of the vehicle, and when the detected vehicle satisfies the distance condition, the second sensor 201 may input a signal indicating the fact to the second camera 202. For example, the distance condition may be "the distance from the second sensor 201 to the vehicle is within a reference range". By setting the reference range as a range that can be assumed as the distance between the vehicle traveling in the lane on the far side and the second sensor 201, the second sensor 201 shown in FIGS. 3 and 4 can accurately detect vehicles that pass through the lane on the far side as viewed from the first sensor 101 (that is, other obstacles are not detected).

The first camera 102 and the second camera 202 perform imaging in response to detection of vehicle passage by the first sensor 101 and the second sensor 201, respectively.

For example, the first camera 102 may continuously capture a predetermined number of still images in response to detection by the first sensor 101 (for example, about several tens to a hundred per second) to generate a plurality of still image files. The predetermined number can be arbitrarily determined in advance according to the performance of the first camera 102, the moving speed of the vehicle, and the like. By appropriately setting the predetermined number, the vehicle detected by the first sensor 101 can be included in the plurality of images continuously captured in response to the detection by the first sensor 101.

For example, the second camera 202 may continuously capture a predetermined number of still images in response to detection by the second sensor 201 (for example, about several tens to a hundred per second) to generate a plurality of still image files. The predetermined number can be arbitrarily determined in advance according to the performance of the second camera 202, the moving speed of the vehicle, and the like. By appropriately setting the predetermined number, the vehicle detected by the second sensor 201 can be included in the plurality of images continuously captured in response to the detection by the second sensor 201.

In addition, the first camera 102 may capture a moving image for a predetermined imaging period of time in response to detection by the first sensor 101 to generate a moving image file consisting of a plurality of frames. The predetermined imaging period of time can be arbitrarily determined in advance according to the performance of the first camera 102, the moving speed of the vehicle, and the like. By appropriately setting the predetermined imaging period of time, the vehicle detected by the first sensor 101 can be included in the moving image captured in response to the detection by the first sensor 101.

In addition, the second camera 202 may capture a moving image for a predetermined imaging period of time in response to detection by the second sensor 201 to generate a moving image file consisting of a plurality of frames. The predetermined imaging period of time can be arbitrarily determined in advance according to the performance of the second camera 202, the moving speed of the vehicle, and the like. By appropriately setting the predetermined imaging period of time, the vehicle detected by the second sensor 201 can be included in the moving image captured in response to the detection by the second sensor 201.

The position and orientation of the first camera 102 are set so as to capture the vehicle detected by the first sensor 101 by performing imaging in response to detection by the first sensor 101. The position and orientation of the second camera 202 are set so as to capture the vehicle detected by the second sensor 201 by performing imaging in response to detection by the second sensor 201.

The image files generated by the first camera 102 and the second camera 202 are input to the analysis apparatus 10 by real time processing or batch processing. The image file is associated with a generation date and time (generation timing) or an imaging date and time (imaging timing). The analysis apparatus 10, the first camera 102, and the second camera 202 may be configured to be able to communicate with each other by any communication means.

Figure 3:
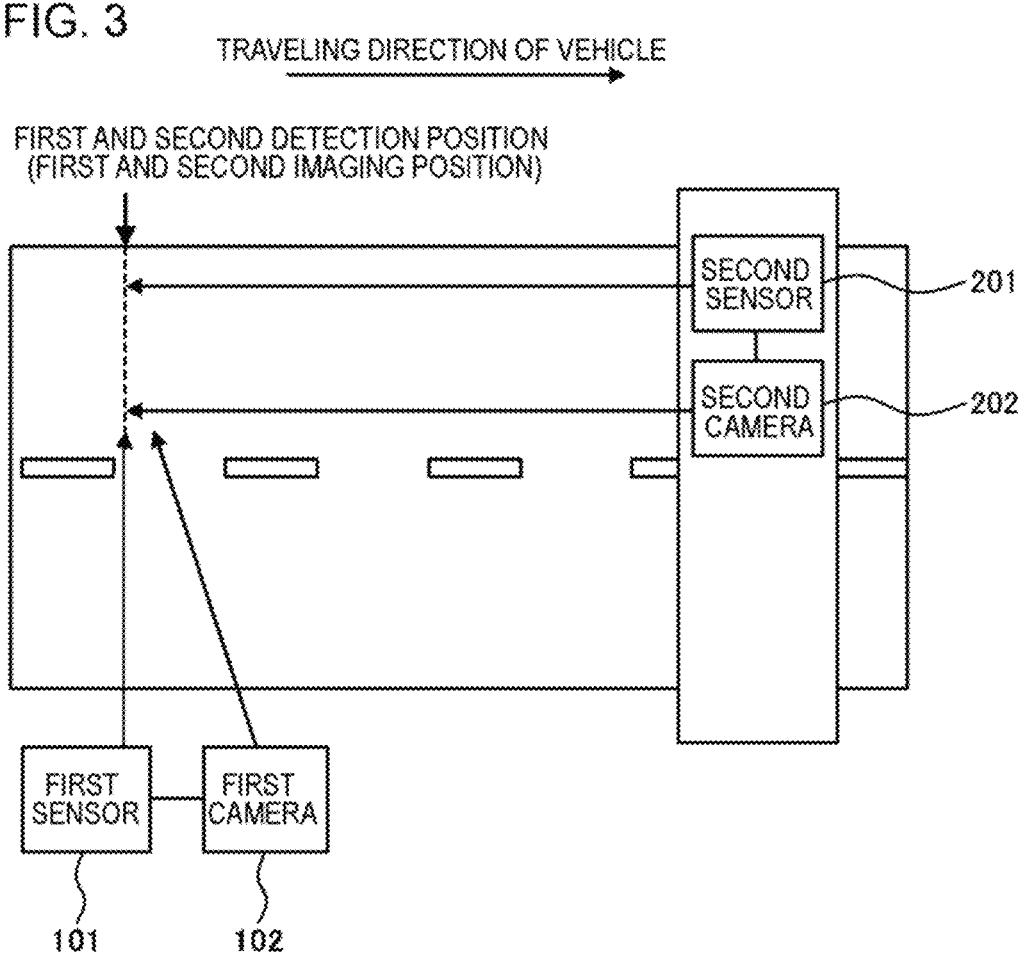
FIG. 3 is a diagram for explaining an example of an image capturing method of the present example embodiment.

In the case of the example in FIG. 3, the first detection position that is the position of the vehicle detected by the first sensor 101 and the second detection position that is the position of the vehicle detected by the second sensor 201 are the same or the difference therebetween is sufficiently small. Therefore, the first imaging position of which the first camera 102 captures an image and the second imaging position of which the second camera 202 captures an image are the same, or the difference therebetween is sufficiently small. In this case, any one vehicle is detected by the first sensor 101 and the second sensor 201 at the same time or with a slight time difference, and captured by the first camera 102 and the second camera 202 at the same time or with a slight time difference.

Figure 4:
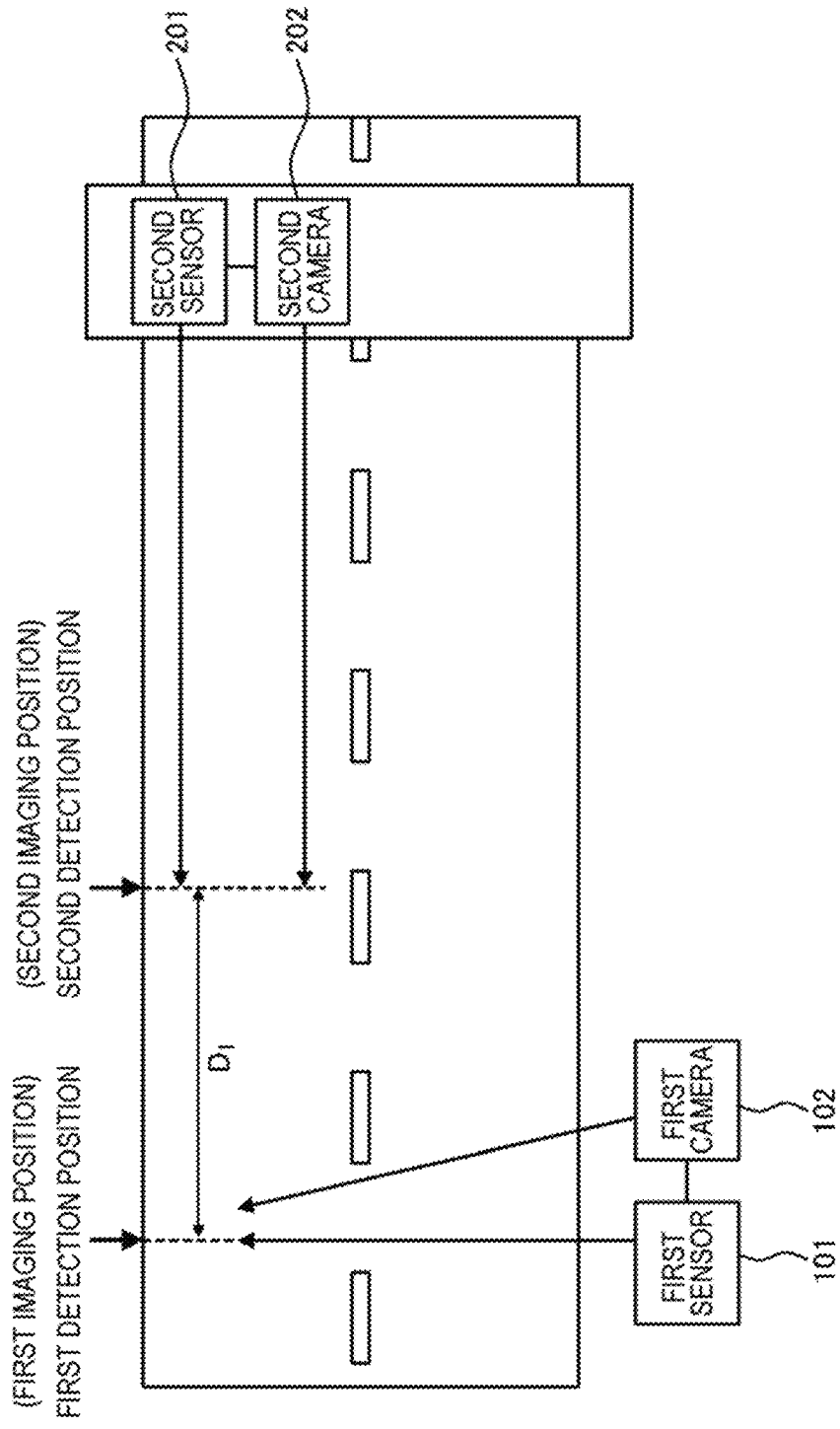
FIG. 4 is a diagram for explaining an example of the image capturing method of the present example embodiment.

In the case of the example in FIG. 4, the first detection position and the second detection position are different, and the difference therebetween is sufficiently large. Therefore, the first imaging position is different from the second imaging position, and the difference therebetween is sufficiently large. Specifically, the first detection position and the first imaging position are on a near side in the traveling direction of the vehicle, and the second detection position and the second imaging position are on a far side. Although not shown, the second detection position and the second imaging position may be on the near side in the traveling direction of the vehicle, and the first detection position and the first imaging position may be on the far side. In such a case, any one vehicle is detected with a certain large time difference by the first sensor 101 and the second sensor 201 and is captured by the first camera 102 and the second camera 202 with a certain large time difference.

Considering detection of a pair of a first image (image captured by the first camera 102) and a second image (image captured by the second camera 202) obtained by capturing the same vehicle, it is preferable to install sensors and cameras as in the example in FIG. 3. However, due to restrictions on the installation environment, sensors and cameras cannot be installed as shown in FIG. 3, and may be installed as in the example of FIG. 4.

Returning to FIG. 2, with a plurality of first images (first image group) which are a predetermined number of still images or a moving image (a plurality of frame images) for a predetermined imaging period of time captured by the first camera 102 in response to one detection by the first sensor 101 as an object to be processed, the first image analysis unit 11 detects a vehicle and a human face from each of the plurality of first images which are the object to be processed.

Detecting vehicles and human faces may be realized by template matching. Further, it may be performed by a detector constructed by machine learning using a large number of images. As the detector, for example, a support vector machine (SVM), a linear discriminant analysis (LDA), a generalized learning vector quantization (GLVQ), a neural network, or the like may be used. The vehicle included in the first image is in side view. Therefore, it is preferable to use the image of the vehicle in side view as templates or training data. Further, although it is considered that the faces of most of the persons included in the first image are profiles, the possibility of front faces cannot be excluded. Therefore, it is preferable to use face images captured from various directions as templates or training data.

It should be noted that, the human face to be detected may be the face of the person in the detected vehicle, that is, the face inside the detected outline of the vehicle. In this way, it is possible to detect only the faces of persons on the vehicle and to exclude the face of a person such as a passerby or a traffic guide who is outside the vehicle from the detection target.

The first detection unit 12 detects the number of persons on the vehicle that are commonly included in the plurality of first images, on the basis of the analysis result by the first image analysis unit 11 for each of the plurality of first images to be processed.

For example, the first detection unit 12 may detect the number of persons on the vehicle that are commonly included in the plurality of first images, using the technique described in Patent Document 2. That is, the first detection unit 12 may infer on which seats in the vehicle are seated by persons detected from each of the plurality of first images on the basis of how the vehicle looks in each of the plurality of first images obtained by continuously capturing the vehicle, and decide the number of persons on the vehicle by integrating the inference results.

In addition, the number of persons on the vehicle included in common in the plurality of first images may be detected with the following units. First, the first image analysis unit 11 may detect a reference point and reference directions of a vehicle detected from each of the plurality of first images, and set a two-dimensional coordinate system (vehicle coordinate system) in which the detected reference point is an origin, and the detected reference directions are an x-axis direction and a y-axis direction for each first image.

Figure 5:
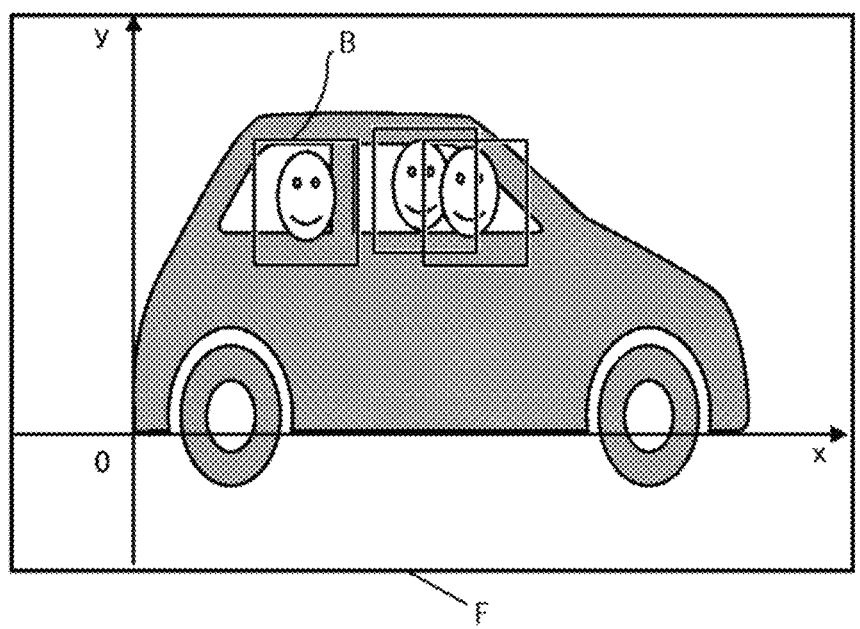
FIG. 5 is a diagram for explaining an example of a vehicle coordinate system of the present example embodiment will be described.

An example of the reference point and the reference directions will be described, but is not limited thereto. FIG. 5 shows an example of a vehicle coordinate system set for one first image F. In the illustrated example, the rear end portion of the bumper attached to the back of the vehicle body is used as a reference point, and the longitudinal direction and height direction of the vehicle are used as reference directions. A vehicle coordinate system is set in which the rear end portion of the bumper is the origin, the longitudinal direction of the vehicle is the x axis, and the height direction is the y axis.

After setting the vehicle coordinate system for each first image, the first image analysis unit 11 may detect the coordinates of the faces of the detected persons on the vehicle coordinate system for each first image.

For example, in the human face detection processing, in a case where an area B where a human face exists is detected as shown in FIG. 5, representative points of the area B (for example, center, upper right, upper left, lower right, lower left, or the like) can be obtained as the coordinates of the face existing in the area B. In addition, in the human face detection processing, in a case where human eyes, nose, mouth, or the like are detected, the coordinates of the eyes, nose, mouth (for example, representative coordinates of the area occupied by the eyes, nose, mouth) can be obtained as the coordinates of the face having the eyes, nose, mouth.

Then, the first detection unit 12 groups a plurality of faces detected from a plurality of first images by collecting the faces having the coordinates of the vehicle coordinate system close to each other. That is, the first detection unit 12 groups the faces of the same person existing in the plurality of first images. For example, the first detection unit 12 may detect the number of groups as the number of persons on the vehicle included in common in the plurality of first images.

Returning to FIG. 2, with a plurality of second images (second image group) which are a predetermined number of still images or a moving image for a predetermined imaging period of time captured by the second camera 202 in response to one detection by the second sensor 201 as an object to be processed, the second image analysis unit 13 detects a vehicle and a human face from each of the plurality of second images.

The detection of the vehicle and the human face can be performed by the same units as the first image analysis unit 11. It should be noted that, the vehicle included in the second image is in front view. Therefore, it is preferable to use the image of the vehicle in front view (an image of the vehicle as viewed from above) as a template or training data. Further, although it is considered that the faces of most of the persons included in the second image are front faces, the possibility of profiles cannot be excluded. Therefore, it is preferable to use face images captured from various directions as templates or training data.

It should be noted that, the human face to be detected may be the face of the person in the detected vehicle, that is, the face inside the detected outline of the vehicle. In this way, it is possible to detect only the faces of persons on the vehicle and to exclude the face of a person such as a passerby or a traffic guide who is outside the vehicle from the detection target.

The second detection unit 14 detects the number of persons on the vehicle that are commonly included in the plurality of second images, on the basis of the analysis result by the second image analysis unit 13 for each of the plurality of second images to be processed. The second detection unit 14 can detect the number of persons on the vehicle that are commonly included in the plurality of second images, using the same technique as the first detection unit 12.

The determination unit 15 determines whether or not the first image (first image group) and the second image (second image group) satisfy the predetermined condition. The determination unit 15 determines whether or not the "predetermined condition: the time when the first image is generated and the time when the second image is generated has a predetermined relationship" is satisfied. It is inferred that the first image and the second image that satisfy the predetermined condition include the same vehicle in the images.

In the case of the example in FIG. 3, that is, in a case where the first detection position (first imaging position) and the second detection position (second imaging position) are the same or the difference therebetween is sufficiently small, the determination unit 15 determines whether or not "predetermined condition: the difference between the time when the first image is generated and the time when the second image is generated is within a reference value (a sufficiently small value)" is satisfied.

In the case of the example in FIG. 4, that is, in a case where the first detection position (first imaging position) and the second detection position (second imaging position) are different and the difference therebetween is sufficiently large, the determination unit 15 determines whether or not "predetermined condition: the difference between the time when the first image is generated and the time when the second image is generated is within the reference range" is satisfied.

The reference range may be determined in advance and stored in any storage device. Then, the determination unit 15 may perform the determination, on the basis of the reference range stored in the storage device (Example 1). In addition, the reference range may be decided for each vehicle by image analysis (Example 2). Each example will be described below.

Example 1

In this example, the reference range is decided on the basis of the time required for the movement of the vehicle between the first detection position and the second detection position which is decided on the basis of the distance D1 [km] between the first detection position and the second detection position and the reference speed of the vehicle. It should be noted that, the same process may be performed by replacing the first detection position with the first imaging position and replacing the second detection position with the second imaging position.

The reference speed may be a legal speed of a road to which the analysis apparatus 10 of the present example embodiment is applied, a general speed of a vehicle traveling on the road, or the like. For example, a range can be given as V1 [km/h] or more and V2 [km/h] or less. In this case, the reference range is D1/V2 [h] or more and D1/V1 [h] or less.

Example 2

Even in this example, the reference range is decided on the basis of the time required for the movement of the vehicle between the first detection position and the second detection position which is decided on the basis of the distance D1 [km] between the first detection position and the second detection position and the reference speed of the vehicle. However, the reference speed of the vehicle is different from Example 1. It should be noted that, the same process may be performed by replacing the first detection position with the first imaging position and replacing the second detection position with the second imaging position.

In this example, at least one of the first image analysis unit 11 and the second image analysis unit 13 analyzes the image and calculates the speed V3 [km/h] of the vehicle included in the image. Then, the reference speed of the vehicle is decided so as to include the calculated speed V3 [km/h] of the vehicle. For example, a range can be given such that the reference speed is V4 [km/h] or more and V5 [km/h] or less. It should be noted that, V4<V3<V5. In this case, the reference range is D1/V5 [h] or more and D1/V4 [h] or less.

The first image analysis unit 11 can analyze a plurality of time-series first images (first image group) captured continuously, and calculate the speed of the vehicle commonly included in the plurality of first images. The speed of the vehicle can be calculated on the basis of, for example, the moving distance in vehicle image between the two first images, the scale of the image held in advance, and the time difference in the imaging timing between the two first images.

Further, the second image analysis unit 13 can analyze a plurality of time-series second images which are captured continuously, and calculate the speed of the vehicle commonly included in the plurality of second images. The speed of the vehicle can be calculated on the basis of, for example, the moving distance in vehicle image between the two second images, the scale of the image held in advance, and the time difference in the imaging timing between the two second images.

In the case of Example 2, for example, in the process of detecting the second image group that satisfies a predetermined condition with the first image group to be processed, the speed of the vehicle included in the first image group is calculated to set the reference speed. Next, a reference range is decided on the basis of the reference speed. Then, the second image group having the time difference in the imaging time from the first image group (for example, time difference in imaging start time) being within the decided reference range is determined to satisfy the predetermined condition with the first image group. It should be noted that, the imaging date and time are stored in association with each image, and these can be read to calculate the time difference.

In addition, for example, in the process of detecting the first image group that satisfies a predetermined condition with the second image group to be processed, the speed of the vehicle included in the second image group is calculated to set the reference speed. Next, a reference range is decided on the basis of the reference speed. Then, the first image group having the time difference in the imaging time from the second image group being within the decided reference range is determined to satisfy the predetermined condition with the second image group. It should be noted that, the imaging date and time are stored in association with each image, and these can be read to calculate the time difference.

It should be noted that, the predetermined condition may be a content obtained by further considering the before and after relationship of the first detection position (first imaging position) and the second detection position (second imaging position) with respect to the traveling direction of the vehicle. For example, in a case where the first detection position (first imaging position) is before the second detection position (second imaging position) with respect to the traveling direction of the vehicle, the predetermined condition may be "the difference between the time when the first image is generated and the time when the second image is generated is within the reference range, and the time when the first image is generated is earlier than the time when the second image is generated". Conversely, in a case where the second detection position (second imaging position) is before the first detection position (first imaging position) with respect to the traveling direction of the vehicle, the predetermined condition may be "the difference between the time when the first image is generated and the time when the second image is generated is within the reference range, and the time when the second image is generated is earlier than the time when the first image is generated".

In Example 2, instead of the process of detecting the vehicle speed by image analysis, the speed (for example, average speed) of the vehicle traveling in each lane may be detected by a speed sensor.

In a case where the first image (first image group) and the second image (second image group) satisfy a predetermined condition, the decision unit 16 decides the number of occupants in the vehicle captured in common in these images, with use of the number of occupants in the vehicle captured in the first image group detected by the first detection unit 12 and the number of occupants in the vehicle captured in the second image group detected by the second detection unit 14.

The decision unit 16 can decide the larger one of the number of occupants in the vehicle captured in the first image group detected by the first detection unit 12 and the number of occupants in the vehicle captured in the second image group detected by the second detection unit 14 as the number of occupants in the vehicle that are captured in common in these images.

It should be noted that, in a case where the first image group does not satisfy a predetermined condition with any second image group, the decision unit 16 may decide the number of occupants in the vehicle captured in the first image group with use of the number of occupants in the vehicle captured in the first image group detected by the first detection unit 12. In this case, the decision unit 16 can decide the number of occupants in the vehicle captured in the first image group detected by the first detection unit 12 as the number of occupants in the vehicle captured in the first image group.

In addition, in a case where the first image group does not satisfy the predetermined condition with any second image group, the decision unit 16 may not decide the number of occupants in the vehicle captured in the first image group and may output an error.

In addition, in a case where the second image group does not satisfy a predetermined condition with any first image group, the decision unit 16 may decide the number of occupants in the vehicle captured in the second image group with use of the number of occupants in the vehicle captured in the second image group detected by the second detection unit 14. In this case, the decision unit 16 can decide the number of occupants in the vehicle captured in the second image group detected by the second detection unit 14 as the number of occupants in the vehicle captured in the second image group.

In addition, in a case where the second image group does not satisfy the predetermined condition with any first image group, the decision unit 16 may not decide the number of occupants in the vehicle captured in the second image group and may output an error.

Next, an example of the processing flow of the analysis apparatus 10 will be described with use of the flowchart of FIG. 6.

In S10, the first image analysis unit 11 detects the faces of the persons, from a first image group generated by the first camera that captures a vehicle passing through the road. Then, the first detection unit 12 detects the number of occupants in the vehicle captured in the first image group, on the basis of the detection result by the first image analysis unit 11.

In S11, the second image analysis unit 13 detects the faces of the persons, from a second image group generated by the second camera that captures the vehicle passing through the road. Then, the second detection unit 14 detects the number of occupants in the vehicle captured in the second image group, on the basis of the detection result by the second image analysis unit 13.

In S12, the determination unit 15 determines whether or not the first image group and the second image group satisfy a predetermined condition. For example, the determination unit 15 sets any first image group as an object to be processed, and determines whether the first image group and the second image group satisfy a predetermined condition, thereby detecting a second image group that satisfies a predetermined condition with the first image group. Alternatively, the determination unit 15 sets any second image group as an object to be processed, and determines whether the second image group and the first image group satisfy a predetermined condition, thereby detecting a first image group that satisfies a predetermined condition with the second image group.

Figure 6:
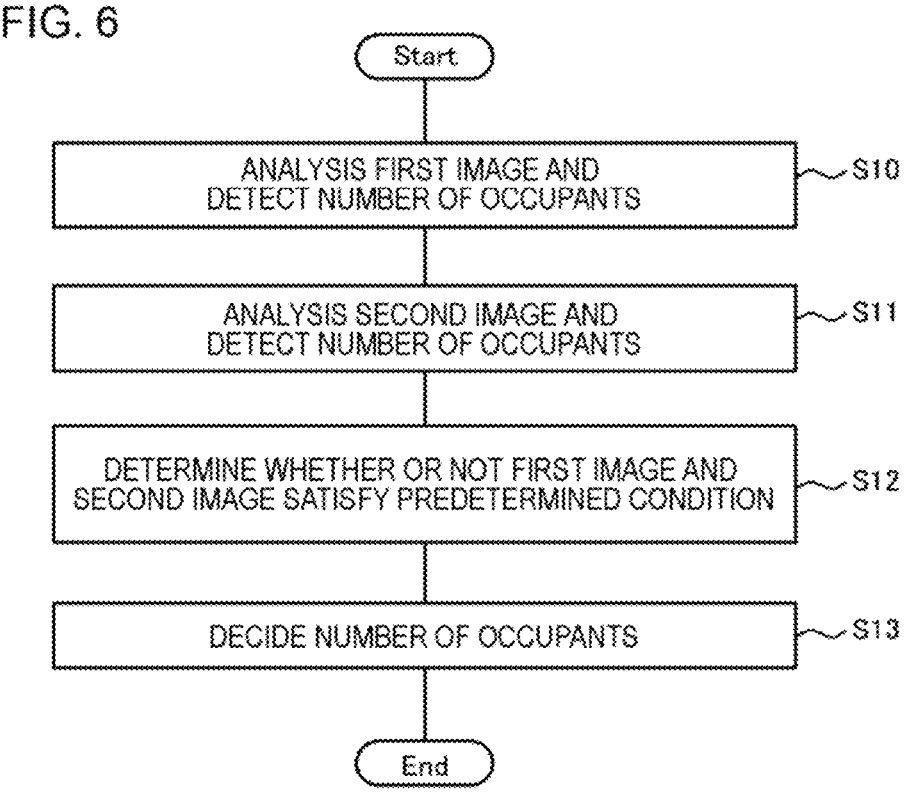
FIG. 6 is a flowchart showing an example of a process flow of the analysis apparatus of the present example embodiment.

It should be noted that, the order of the processes of S10, S11, and S12 is not limited to the order shown in FIG. 6, and may be in other order. These processes may be performed in parallel.

In S13, in a case where the first image group and the second image group satisfy a predetermined condition, the decision unit 16 decides the number of occupants in the vehicle with use of the number of occupants in the vehicle captured in the first image group detected by the first detection unit 12 and the number of occupants in the vehicle captured in the second image group detected by the second detection unit 14. For example, the decision unit 16 decides the larger one of the number of occupants in the vehicle captured in the first image group detected by the first detection unit 12 and the number of occupants in the vehicle captured in the second image group detected by the second detection unit 14 as the number of occupants in the vehicles captured in these image groups.

Here, a modification example of the present example embodiment will be described. In the above-described example, images are captured by two pairs of sensors and cameras from two directions, and the number of occupants is decided on the basis of the images. However, images may be captured by three or more pairs of sensors and cameras from three or more directions, and the number of occupants may be decided on the basis of the images. Even in this case, a combination of image groups that satisfy a predetermined condition is detected in the same manner, and the largest value of the number of occupants in the vehicle detected from each of the plurality of image groups can be decided as the number of occupants in the vehicle captured in these image groups.

Further, as in the example of FIG. 3, in a case where the first detection position and the second detection position are the same or the difference therebetween is sufficiently small, one of the first sensor 101 and the second sensor 201 may be omitted. Then, the first camera 102 and the second camera 202 may perform imaging in response to the detection of the vehicle by the remaining sensors.

In the above-described example, the first camera 102 and the second camera 202 capture a plurality of still images or moving images. However, the first camera 102 and the second camera 202 may capture one still image in response to detection by the first sensor 101 and the second sensor 201 to generate one still image file. In this case, the first detection unit 12 detects the number of persons detected from the first image as the number of persons on the vehicle included in the first image. Then, the second detection unit 14 detects the number of persons detected from the second image as the number of persons on the vehicle included in the second image. Other configurations are the same as those described above.

In addition, the first camera 102 and the second camera 202 may not perform imaging in response to the detection of the first sensor 101 and the second sensor 201, but may continue imaging at all times.

According to the analysis apparatus 10 of the present example embodiment described above, a new technique for detecting the number of persons on a vehicle is realized.

According to the analysis apparatus 10 of the present example embodiment in which a plurality of cameras capture images, one vehicle can be captured from a plurality of directions. Then, it is possible to detect the number of persons on a vehicle, by analyzing a plurality of images obtained by capturing the vehicle from a plurality of directions. For example, even when at least one occupant is hidden behind an object in an image captured from a certain direction and cannot be detected, all occupants may be detected in an image captured from another direction. According to the analysis apparatus 10 of the present example embodiment which detects the number of persons on the vehicle on the basis of the analysis results of a plurality of images obtained by capturing the vehicle from a plurality of directions, the detection accuracy of the number of occupants is improved. The detection accuracy improves as the capturing direction increases.

In addition, the analysis apparatus 10 according to the present example embodiment can detect a pair of the first image group and the second image group inferred to include the same vehicle, by determining whether or not a predetermined condition defined by an imaging time or the like is satisfied. Compared to the case where the characteristics of the vehicle included in the image are detected by image analysis or the like and the pair of the first image group and the second image group including the vehicle having similar characteristics is detected, the processing load on the computer can be reduced.

Further, since the pair can be detected as described above, the degree of freedom in installing the sensor and the camera is increased. For example, as shown in FIG. 3, the detection position of the vehicle by the first sensor 101 may be close to the detection position of the vehicle by the second sensor 201, or as shown in FIG. 4, the detection position of the vehicle by the first sensor 101 may be separated from the detection position of the vehicle by the second sensor 201. In any case, it is possible to detect a pair of the first image group and the second image group inferred to include the same vehicle, by determining whether or not the first image group and the second image group satisfy a predetermined condition defined by an imaging time or the like.

Further, by setting the reference speed of the vehicle to a fixed value as in Example 1 described above, the processing load on the analysis apparatus 10 can be reduced.

Further, as in Example 2 described above, the accuracy of processing for associating images including the same vehicle is improved by calculating the vehicle reference speed for each vehicle by image analysis or the like.

Further, according to the analysis apparatus 10 of the present example embodiment, in a case where there is a first image group that does not satisfy a predetermined condition with any second image group, the number of occupants detected on the basis of the first image group can be decided as the number of occupants in a vehicle captured in the image group. Similarly, in a case where there is a second image group that does not satisfy a predetermined condition with any first image group, the number of occupants detected on the basis of the second image group can be decided as the number of occupants in a vehicle captured in the image group.

For example, in the case of the installation example shown in FIG. 4, a situation may occur in which a vehicle detected and captured at the first detection position is not detected and captured at the second detection position. For example, the above-described situation may occur due to a vehicle lane change, and a lower-speed traveling of a vehicle than a reference speed (the case of a fixed value determined on the basis of a legal speed or the like (Example 1 described above)). Further, in both the installation examples of FIGS. 3 and 4, a situation may occur in which a vehicle detected and captured from one direction is not detected and captured from the other direction due to the presence of an obstacle or the like.

In such a case, although the detection accuracy is lower than the process of integrating the number of occupants detected from each of the first image group and the second image group, the number of occupants in the vehicle captured in the image group is decided on the basis of the number of occupants detected from one image group, so it is possible to avoid the inconvenience that the detection result (the number of occupants) for the detected vehicle cannot be obtained.

It should be noted that, according to the analysis apparatus 10 of the present example embodiment, in a case where there is a first image group that does not satisfy a predetermined condition with any second image group, an error can be output without deciding the number of occupants in the vehicle captured in the first image group. Similarly, in a case where there is a second image group that does not satisfy the predetermined condition with any first image group, an error can be output without deciding the number of occupants in the vehicle captured in the second image group. In such a case, since the detection result (the number of occupants) with low reliability is not generated, the reliability of the detection result (the number of occupants) is improved.

In addition, according to the analysis apparatus 10 of the present example embodiment, the number of occupants in the vehicle can be detected with use of the images generated by the first camera that captures the vehicle from the side and the second camera that captures the vehicle from the front. There is a higher possibility that a person in the rear seat can be detected as compared to a case where only an image generated by a camera that captures the vehicle from the front is used. Further, compared with the case where only the image generated by the camera that captures the vehicle from the side is used, the accuracy of the detection result (the number of occupants) is improved by using an image generated by the camera that captures the vehicle from the front, even in a case where the target vehicle is blocked by another vehicle or the like passing through the lane on the near side.

Second Example Embodiment

First, the outline of an analysis apparatus 10 of the present example embodiment will be described. The analysis apparatus 10 according to the present example embodiment executes a process for detecting the number of persons on the vehicle for all lanes of a road having two or more lanes. A unit that analyzes an image captured from one direction is adopted for one lane, and a unit that analyzes images captured from a plurality of directions is adopted for the other lane. That is, different units are adopted according to the lane. Other configurations of the analysis apparatus 10 are the same as those in the first example embodiment. With respect to the present example embodiment, a modification example described in the first example embodiment can be employed.

The hardware configuration of the analysis apparatus 10 is the same as that in the first example embodiment.

Next, the installation examples of sensors and cameras of the present example embodiment are described with reference to FIGS. 8 and 9.

Figure 8:
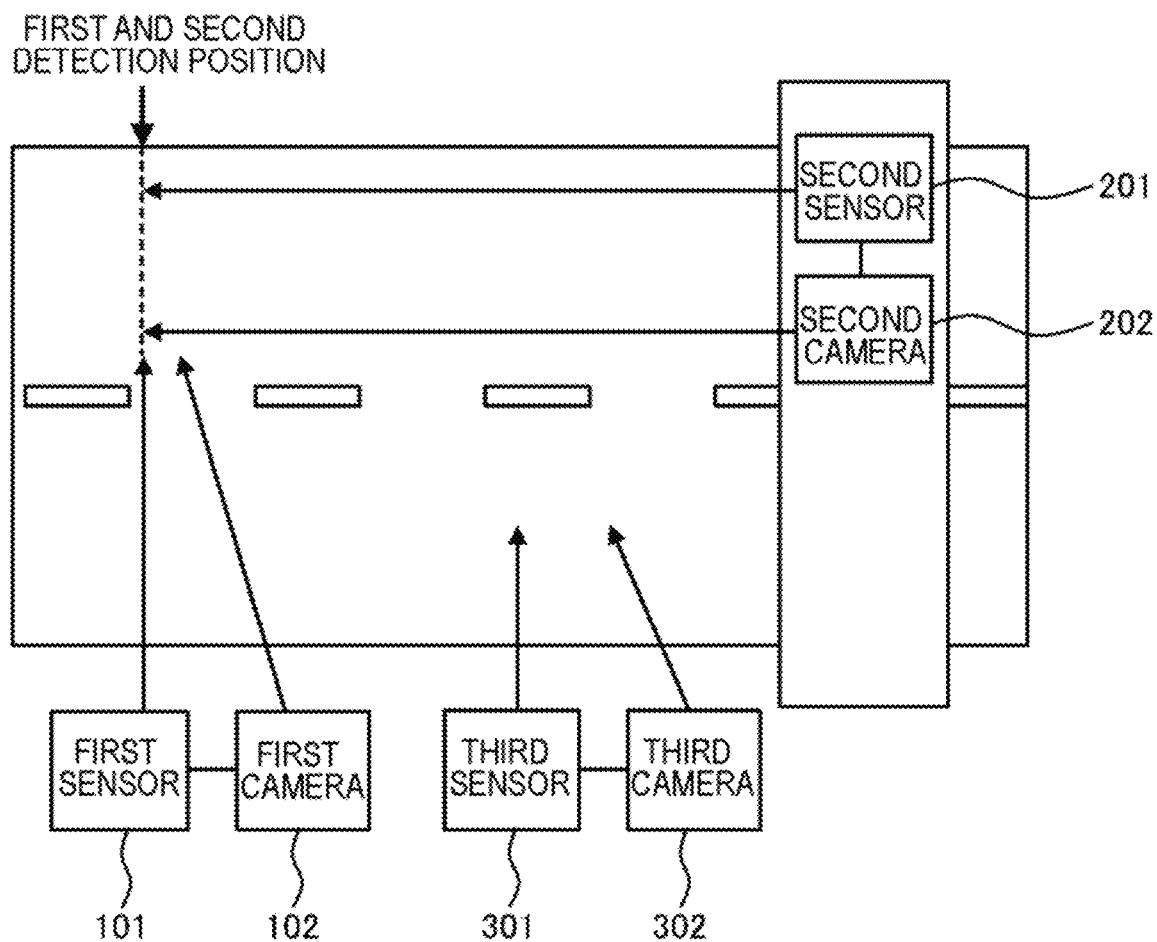
FIG. 8 is a diagram for explaining an example of the image capturing method of the present example embodiment.

The installation example in FIG. 8 is different from the installation example in FIG. 3 in that a third sensor 301 and a third camera 302 are newly provided. The installation method of the first sensor 101, the first camera 102, the second sensor 201, and the second camera 202 is the same as the installation example of FIG. 3.

Figure 9:
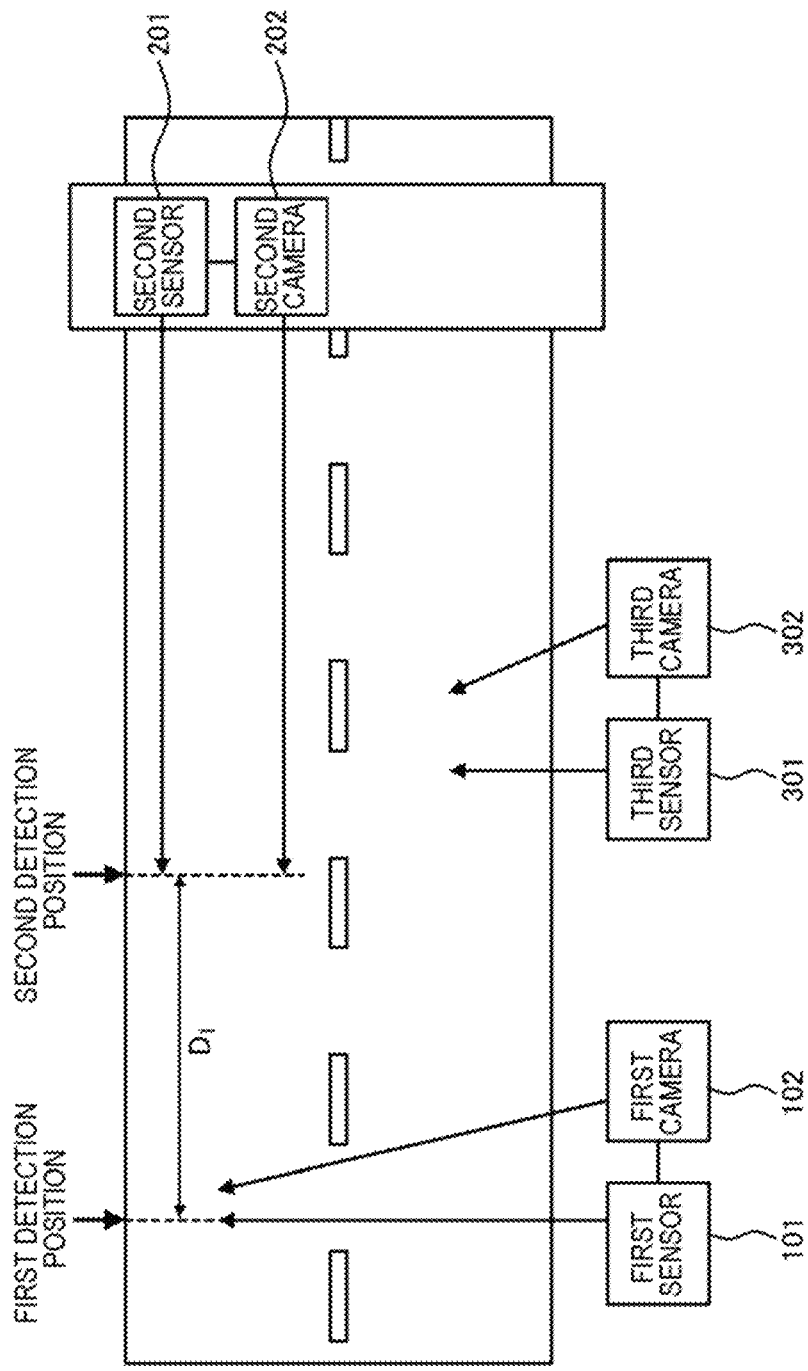
FIG. 9 is a diagram for explaining an example of the image capturing method of the present example embodiment.

The installation example in FIG. 9 is different from the installation example in FIG. 4 in that the third sensor 301 and the third camera 302 are newly provided. The installation method of the first sensor 101, the first camera 102, the second sensor 201, and the second camera 202 is the same as the installation example of FIG. 4.

The third sensor 301 is installed along the road and detects a vehicle passing through the road from the side. The third sensor 301 detects a vehicle passing through the lane on the near side as viewed from the third sensor 301. The third camera 302 is installed along the road and captures a vehicle passing through the road from the side. The third camera 302 captures a vehicle passing through the lane on the near side as viewed from the third camera 302.

The third sensor 301 detects that the vehicle has passed a predetermined position on the road. The details of the third sensor 301 are not limited as long as such detection can be realized. For example, the third sensor 301 may include a means that emits light (for example, laser) in a predetermined direction (for example, the direction of an arrow in the drawing) and a means that receives the reflected light thereof. Then, the passage of the vehicle may be detected by detecting the presence of an obstacle that hinders the progress of the emitted light based on the light receiving condition of the reflected light.

Further, the third sensor 301 may have a means that measures the distance to the detected obstacle. For example, the distance to the obstacle that reflects the light may be calculated on the basis of the time difference from the light emission timing to the light reception timing of the reflected light.

When detecting the passage of the vehicle, the third sensor 301 inputs a signal indicating that fact to the third camera 302. It should be noted that, the third sensor 301 may detect the passage of the vehicle, and when the detected vehicle satisfies the distance condition, the third sensor 301 may input a signal indicating the fact to the third camera 302. For example, the distance condition may be "the distance from the third sensor 301 to the vehicle is within a reference range". By setting the reference range as a range that can be assumed as the distance between the vehicle traveling in the lane on the near side and the third sensor 301, the third sensor 301 shown in FIGS. 8 and 9 can accurately detect only vehicles passing through the lane on the near side as viewed from the third sensor 301 (that is, vehicles passing through the lane on the far side are not detected).

The third camera 302 performs imaging in response to the detection of the passage of the vehicle by the third sensor 301. For example, the third camera 302 may continuously capture a predetermined number of still images in response to the detection by the third sensor 301 (for example, about several tens to a hundred images per second) to generate a plurality of still image files. The predetermined number can be arbitrarily determined in advance according to the performance of the third camera 302, the moving speed of the vehicle, and the like. By appropriately setting the predetermined number, the vehicle detected by the third sensor 301 can be included in the plurality of images continuously captured in response to the detection by the third sensor 301.

In addition, the third camera 302 may capture a moving image for a predetermined imaging period of time in response to detection by the third sensor 301 to generate a moving image file consisting of a plurality of frames. The predetermined imaging period of time can be arbitrarily determined in advance according to the performance of the third camera 302, the moving speed of the vehicle, and the like. By appropriately setting the predetermined imaging period of time, the vehicle detected by the third sensor 301 can be included in the moving image captured in response to the detection by the third sensor 301.

In addition, the third camera 302 may capture one still image in response to detection by the third sensor 301 and generate one still image file.

The position and orientation of the third camera 302 are set so as to capture the vehicle detected by the third sensor 301 by capturing in response to detection by the third sensor 301.

The image file generated by the third camera 302 is input to the analysis apparatus 10 by real time processing or batch processing. The image file is associated with a generation date and time (generation timing) or an imaging date and time (imaging timing). The analysis apparatus 10 and the third camera 302 may be configured to be able to communicate with each other by any communication unit.

Figure 7:
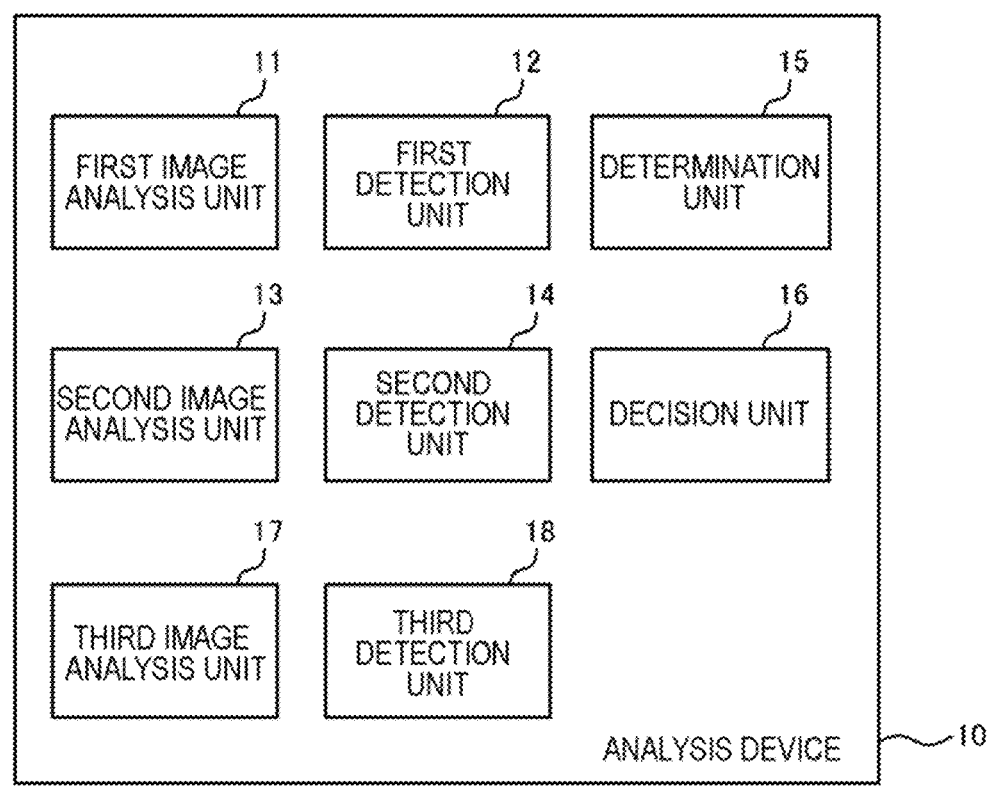
FIG. 7 is an example of a functional block diagram of the analysis apparatus of the present example embodiment.

FIG. 7 shows an example of a functional block diagram of an analysis apparatus 10 of the present example embodiment. As illustrated, the analysis apparatus 10 includes a first image analysis unit 11, a first detection unit 12, a second image analysis unit 13, a second detection unit 14, a determination unit 15, a decision unit 16, a third image analysis unit 17, and a third detection unit 18. The configurations of the first image analysis unit 11, the first detection unit 12, the second image analysis unit 13, the second detection unit 14, and the determination unit 15 are the same as those in the first example embodiment.

The third image analysis unit 17 detects a vehicle and a human face from one or more third images by units similar to the first image analysis unit 11.

The third detection unit 18 detects the number of persons on the vehicle included in one or more third images by the same units as the first detection unit 12.

The decision unit 16 decides the number of persons detected from the third image as the number of persons on the vehicle included in the third image. The number of persons detected from the third image is the number of persons on the vehicle included in the one or more third images detected by the third detection unit 18. Other configurations of the decision unit 16 are the same as those in the first example embodiment.

Next, a modification example of the present example embodiment will be described. Although the example of two lanes is described above, the same unit can be employed also in the case of three lanes or more. For example, a unit that analyzes the image captured from one direction (a unit realized by the decision unit 16, the third image analysis unit 17, and the third detection unit 18) may be employed for the lane on the near side as seen from the side where the sensor and camera are installed, and a unit that analyzes the image captured from a plurality of directions (a unit realized by the first image analysis unit 11, the first detection unit 12, the second image analysis unit 13, the second detection unit 14, the determination unit 15, and the decision unit 16) may be employed for the other lanes.

In this case, the first camera 102 may be installed along a road having two or more lanes, and may capture vehicles passing through one or more lanes other than the lane closest to the first camera 102 among the two or more lanes from the side. The second camera 202 may be installed above a road having two or more lanes, and may capture vehicles passing through one or more lanes other than the lane closest to the first camera 102 among the two or more lanes from the front.

Further, as shown in FIG. 10, the first sensor 101 may detect a vehicle passing through each of a plurality of lanes. In this case, on the basis of the distance to the vehicle detected by the distance sensor, it can be determined which lane the vehicle traveling in is detected. Then, in a case where a vehicle passing through the lane on the near side as viewed from the first sensor 101 is detected, the third camera 302 performs imaging. On the other hand, in a case where a vehicle passing through the lane on the far side as seen from the first sensor 101 is detected, the first camera 102 and the second camera 202 perform imaging.

It should be noted that, the second camera 202 may be configured to capture both lanes. Even in such a case, as described above, the second camera 202 may perform imaging only in a case where a vehicle passing through the lane on the far side as viewed from the first sensor 101 is detected, and may not perform imaging in a case where a vehicle passing through the lane on the near side as viewed from the first sensor 101 is detected. In addition, even in a case where a vehicle passing through any lane is detected, the second camera 202 performs imaging, and the image generated by the second camera 202 may be used for only the detection of the number of occupants in the vehicle passing through the lane on the far side as viewed from the first sensor 101.

In addition, as follows, the analysis apparatus 10 may include a unit that detects that a vehicle passing through the lane on the far side (hereinafter referred to as "far lane") as viewed from the first sensor 101 is blocked by a vehicle passing through the lane on the near side (hereinafter referred to as "near lane") as viewed from the first sensor 101 (hereinafter referred to as "vehicle shielding").

For example, the analysis apparatus 10 may detect vehicle shielding with a sensor. Specifically, the vehicle shielding may be detected in response to the detection of a vehicle traveling in the near lane and a vehicle traveling in the far lane within a predetermined time. In addition, the vehicle shielding may be detected in response to the detection of the vehicle traveling in the near lane, before the vehicle traveling in the far lane is no longer detected (a case where two lanes are detected by one sensor). In addition, the vehicle shielding may be detected in response to the detection of the vehicle traveling in the far lane, without missing, after the vehicle traveling in the near lane is detected up to the tail (a case where two lanes are detected by one sensor).

In addition, the analysis apparatus 10 may detect vehicle shielding by image processing. For example, the vehicle shielding may be detected by detecting that two vehicles are overlapped by image processing.

It should be noted that, in a case where the vehicle in the far lane is blocked by the vehicle in the near lane, the second camera 202 that captures the far lane from the front may be activated. In addition, in a case where the vehicle in the far lane is blocked by the vehicle in the near lane, the number of occupants may also be detected with use of an image generated by the second camera 202 obtained by capturing the far lane from the front. In such a case, the accuracy of detecting the number of occupants based on the image generated by the first camera 102 that captures the far lane from the side becomes insufficient. Therefore, the number of occupants is detected using an image generated by the second camera 202.

On the other hand, in a case where the vehicle in the far lane is not blocked by the vehicle in the near lane, even when a vehicle traveling in the far lane is detected, the second camera 202 that captures the far lane from the front may not be activated. In addition, in a case where the vehicle in the far lane is not blocked by the vehicle in the near lane, the number of occupants may also be detected without using an image generated by the second camera 202 obtained by capturing the far lane from the front. In such a case, the accuracy of detecting the number of occupants based on the image generated by the first camera 102 that captures the far lane from the side is increased to some extent. Therefore, the number of occupants is detected using only the image generated by the first camera 102 without using the image generated by the second camera 202. In this case, the number of imaging performed by the second camera 202 can be reduced, so the burden on the second camera 202 can be reduced. Further, since the number of images used for detecting the number of occupants can be reduced, the processing load on the analysis apparatus 10 can be reduced.

According to the analysis apparatus 10 of the present example embodiment described above, the same advantageous effects as that of the first example embodiment can be realized.

According to the analysis apparatus 10 of the present example embodiment, the number of occupants can be detected by an appropriate method for each lane of a road having two or more lanes.

For example, persons on a vehicle passing through the far lane may be hidden by vehicles passing through the near side and may not be included in the image when the image is captured from the side of the vehicle. Therefore, with respect to the far lane, a unit that analyzes images captured from a plurality of directions by two or more cameras and integrating the results (a unit realized by the first image analysis unit 11, the first detection unit 12, the second image analysis unit 13, the second detection unit 14, the determination unit 15, and the decision unit 16) is employed.

On the other hand, persons on a vehicle passing through the near lane are less likely to be hidden by other vehicles, in a case where the vehicle is captured from the side thereof. Therefore, with respect to the near lane, a unit that analyzes an image captured from the side (a unit realized by the decision unit 16, the third image analysis unit 17, and the third detection unit 18) is employed.

By detecting the number of occupants by an appropriate method for each lane, it is possible to avoid over-specification of the system and reduce the cost burden while maintaining high detection accuracy.

Examples of reference aspects will be added below.

1. An analysis apparatus including:

a first image analysis unit that detects persons from a first image generated by a first camera for capturing a vehicle passing through a road;

a first detection unit that detects the number of occupants in the vehicle captured in the first image, on the basis of a detection result by the first image analysis unit;

a second image analysis unit that detects persons from a second image generated by a second camera for capturing the vehicle passing through the road;

a second detection unit that detects the number of occupants in the vehicle captured in the second image, on the basis of a detection result by the second image analysis unit;

a determination unit that determines whether or not the first image and the second image satisfy a predetermined condition; and a decision unit that decides, in a case where the first image and the second image satisfy the predetermined condition, the number of occupants in the vehicle with use of the number of occupants in the vehicle captured in the first image detected by the first detection unit and the number of occupants in the vehicle captured in the second image detected by the second detection unit.

2. The analysis apparatus according to 1, in which the first camera generates the first image in response to vehicle detection by a first sensor, in which the second camera generates the second image in response to vehicle detection by a second sensor, in which the first sensor detects the vehicle passing through the road from a side, in which the first camera captures the vehicle from the side, in which the second sensor detects the vehicle from a front, and in which the second camera captures the vehicle from the front.

3. The analysis apparatus according to 1 or 2, in which the first camera is installed along a road having two or more lanes, and captures a vehicle passing through a lane other than a lane closest to the first camera among the two or more lanes from the side, and in which the second camera is installed above the road having two or more lanes, and captures a vehicle passing through the lane other than the lane closest to the first camera, among the two or more lanes, from the front.

4. The analysis apparatus according to any one of 1 to 3, in which the determination unit determines whether or not a time when the first image is generated and a time when the second image is generated satisfy a predetermined relationship.

5. The analysis apparatus according to 4, in which the determination unit calculates, on the basis of a distance between a first imaging position that is a position of which the first camera captures an image and a second imaging position that is a position of which the second camera captures an image, and the speed of the vehicle, a time required for the vehicle to move between the first imaging position and the second imaging position, and determines whether or not a difference between the time when the first image is generated and the time when the second image is generated satisfies a condition determined on the basis of the required time.

6. The analysis apparatus according to any one of 1 to 5, in which the decision unit decides a larger one of the number of occupants in the vehicle captured in the first image detected by the first detection unit and the number of occupants in the vehicle captured in the second image detected by the second detection unit as the number of occupants in the vehicle.

7. The analysis apparatus according to any one of 1 to 6, in which in a case where the first image does not satisfy the predetermined condition with any second image, the decision unit decides the number of occupants in the vehicle with use of the number of occupants in the vehicle captured in the first image detected by the first detection unit.

8. The analysis apparatus according to any one of 1 to 6, in which in a case where the first image does not satisfy the predetermined condition with any second image, the decision unit does not decide the number of occupants in the vehicle captured in the first image and outputs an error.

9. The analysis apparatus according to any one of 1 to 8, in which in a case where the second image does not satisfy the predetermined condition with any first image, the number of occupants in the vehicle is decided with use of the number of occupants in the vehicle captured in the second image detected by the second detection unit.

10. The analysis apparatus according to any one of 1 to 8, in which in a case where the second image does not satisfy the predetermined condition with any first image, the decision unit does not decide the number of occupants in the vehicle captured in the second image and outputs an error.

11. An analysis method executed by a computer, the method including:
a first image analysis step of detecting persons from a first image generated by a first camera for capturing a vehicle passing through a road;
a first detection step of detecting the number of occupants in the vehicle captured in the first image, on the basis of a detection result from the first image analysis step;
a second image analysis step of detecting persons from a second image generated by a second camera for capturing the vehicle passing through the road;
a second detection step of detecting the number of occupants in the vehicle captured in the second image, on the basis of a detection result from the second image analysis step;
a determination step of determining whether or not the first image and the second image satisfy a predetermined condition; and
a decision step of deciding, in a case where the first image and the second image satisfy the predetermined condition, the number of occupants in the vehicle with use of the number of occupants in the vehicle captured in the first image detected in the first detection step and the number of occupants in the vehicle captured in the second image detected in the second detection step.

12. A program causing a computer to function as:
a first image analysis unit that detects persons from a first image generated by a first camera for capturing a vehicle passing through a road;
a first detection unit that detects the number of occupants in the vehicle captured in the first image, on the basis of a detection result by the first image analysis unit;
a second image analysis unit that detects persons from a second image generated by a second camera for capturing the vehicle passing through the road;
a second detection unit that detects the number of occupants in the vehicle captured in the second image, on the basis of a detection result by the second image analysis unit;
a determination unit that determines whether or not the first image and the second image satisfy a predetermined condition; and
a decision unit that decides, in a case where the first image and the second image satisfy the predetermined condition, the number of occupants in the vehicle with use of the number of occupants in the vehicle captured in the first image detected by the first detection unit and the number of occupants in the vehicle captured in the second image detected by the second detection unit.

This application claims priority based on Japanese Patent Application No. 2017-136952 filed on Jul. 13, 2017, and the disclosure of which is incorporated herein in its entirety.

The invention claimed is:
1. An analysis apparatus comprising:
at least one non-transitory memory configured to store one or more instructions; and
at least one processor configured to execute the one or more instructions to:
detect persons from a first image generated by a first camera for capturing a vehicle passing through a road;
detect a number of occupants in the vehicle captured in the first image, based on a first detection result of the first image;
detect the persons from a second image generated by a second camera for capturing the vehicle passing through the road;
detect the number of occupants in the vehicle captured in the second image, based on a second detection result of the second image;
determine whether or not the first image and the second image satisfy a predetermined condition; and
decide, in a case where the first image and the second image satisfy the predetermined condition, the number of occupants in the vehicle using the number of occupants in the vehicle captured in the first image and the number of occupants in the vehicle captured in the second image,
wherein the first camera is installed along the road having two or more lanes, and captures the vehicle passing through a first lane other than a second lane closest to the first camera, among the two or more lanes, from a side, wherein the second camera is installed above the road having the two or more lanes, and captures the vehicle passing through the first lane other than the second lane closest to the first camera, among the two or more lanes, from a front, and wherein the predetermined condition relates to one or multiple of:

a time when the first image is generated and a time when the second image is generated has a predetermined relationship, a difference between the time when the first image is generated and the time when the second image is generated is within a reference value, the difference between the time when the first image is generated and the time when the second image is generated is within a reference range, and a content obtained via consideration of a before-and-after relationship of a position of the first camera at which the first image was generated and a position of the second camera at which the second image was generated with respect to a traveling direction of the vehicle.

2. The analysis apparatus according to claim 1, wherein the first camera generates the first image in response to vehicle detection by a first sensor, wherein the second camera generates the second image in response to vehicle detection by a second sensor, wherein the first sensor detects the vehicle passing through the road from the side, wherein the second sensor detects the vehicle from the front.

3. The analysis apparatus according to claim 1, wherein the processor is further configured to execute the one or more instructions to determine whether or not a first time when the first image is generated and a second time when the second image is generated satisfy the predetermined relationship.

4. The analysis apparatus according to claim 3, wherein the processor is further configured to execute the one or more instructions to calculate, based on a distance between a first imaging position at which the first camera captures an image and a second imaging position at which the second camera captures an image, and a speed of the vehicle, a time required for the vehicle to move between the first imaging position and the second imaging position, and determine whether or not a difference between the first time when the first image is generated and the second time when the second image is generated satisfies the predetermined condition determined based on the time required for the vehicle to move between the first imaging position and the second imaging position.

5. The analysis apparatus according to claim 1, wherein the processor is further configured to execute the one or more instructions to decide a larger one of the number of occupants in the vehicle captured in the first image and the number of occupants in the vehicle captured in the second image as the number of occupants in the vehicle.

6. The analysis apparatus according to claim 1, wherein in another case where the first image does not satisfy the predetermined condition with the second image, the processor is further configured to execute the one or more instructions to decide the number of occupants in the vehicle using the number of occupants in the vehicle captured in the first image.

7. The analysis apparatus according to claim 1, wherein in another case where the first image does not satisfy the predetermined condition with the second image, the processor is further configured to execute the one or more instructions not to decide the number of occupants in the vehicle captured in the first image and outputs an error.

8. The analysis apparatus according to claim 1, wherein in another case where the second image does not satisfy the predetermined condition with the first image, the number of occupants in the vehicle is decided using the number of occupants in the vehicle captured in the second image.

9. The analysis apparatus according to claim 1, wherein in another case where the second image does not satisfy the predetermined condition with the first image, the processor is further configured to execute the one or more instructions not to decide the number of occupants in the vehicle captured in the second image and outputs an error.

10. An analysis method executed by a computer, the method comprising:

detecting persons from a first image generated by a first camera for capturing a vehicle passing through a road;

detecting a number of occupants in the vehicle captured in the first image, based on a first detection result of the first image;

detecting the persons from a second image generated by a second camera for capturing the vehicle passing through the road;

detecting the number of occupants in the vehicle captured in the second image, based on the a second detection result of the second image;

determining whether or not the first image and the second image satisfy a predetermined condition; and deciding, in a case where the first image and the second image satisfy the predetermined condition, the number of occupants in the vehicle using the number of occupants in the vehicle captured in the first image and the number of occupants in the vehicle captured in the second image, wherein the first camera is installed along the road having two or more lanes, and captures the vehicle passing through a first lane other than a second lane closest to the first camera, among the two or more lanes, from a side, wherein the second camera is installed above the road having the two or more lanes, and captures the vehicle passing through the first lane other than the second lane closest to the first camera, among the two or more lanes, from a front, and wherein the predetermined condition relates to one or multiple of:

a time when the first image is generated and a time when the second image is generated has a predetermined relationship, a difference between the time when the first image is generated and the time when the second image is generated is within a reference value, the difference between the time when the first image is generated and the time when the second image is generated is within a reference range, and a content obtained via consideration of a before-and-after relationship of a position of the first camera at which the first image was generated and a position of the second camera at which the second image was generated with respect to a traveling direction of the vehicle.

11. A non-transitory storage medium storing a program causing a computer to:
- detect persons from a first image generated by a first camera for capturing a vehicle passing through a road;
- detect a number of occupants in the vehicle captured in the first image, based on a first detection result of the first image;
- detect the persons from a second image generated by a second camera for capturing the vehicle passing through the road;
- detect the number of occupants in the vehicle captured in the second image, based on the a second detection result of the second image;
- determine whether or not the first image and the second image satisfy a predetermined condition; and
- decide, in a case where the first image and the second image satisfy the predetermined condition, the number of occupants in the vehicle using the number of occupants in the vehicle captured in the first image and the number of occupants in the vehicle captured in the second image,
- wherein the first camera is installed along the road having two or more lanes, and captures the vehicle passing through a first lane other than a second lane closest to the first camera, among the two or more lanes, from a side,
- wherein the second camera is installed above the road having the two or more lanes, and captures the vehicle passing through the first lane other than the second lane closest to the first camera, among the two or more lanes, from a front, and
- wherein the predetermined condition relates to one or multiple of:
- a time when the first image is generated and a time when the second image is generated has a predetermined relationship,
- a difference between the time when the first image is generated and the time when the second image is generated is within a reference value,
- the difference between the time when the first image is generated and the time when the second image is generated is within a reference range, and
- a content obtained via consideration of a before-and-after relationship of a position of the first camera at which the first image was generated and a position of the second camera at which the second image was generated with respect to a traveling direction of the vehicle.

* * * * *